(12) United States Patent
Belt et al.

(10) Patent No.: US 7,330,272 B2
(45) Date of Patent: Feb. 12, 2008

(54) DISCRETE QUARTER WAVE PLATES FOR DISPLACEMENT MEASURING INTERFEROMETERS

(75) Inventors: Robert Todd Belt, Loveland, CO (US); Eric Stephen Johnstone, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 243 days.

(21) Appl. No.: 11/119,220

(22) Filed: Apr. 29, 2005

(65) Prior Publication Data

US 2006/0244971 A1    Nov. 2, 2006

(51) Int. Cl.
*G01B 9/02* (2006.01)
*G01B 11/02* (2006.01)

(52) U.S. Cl. .................. 356/487; 356/493; 356/498

(58) Field of Classification Search ............... 356/491, 356/492, 493, 498, 486, 487, 577
See application file for complete search history.

(56) References Cited

U.S. PATENT DOCUMENTS 5,677,768 A * 10/1997 Bockman ................. 356/487
6,542,247 B2 * 4/2003 Bockman ................. 356/493
2006/0017933 A1 * 1/2006 Schluchter et al. ....... 356/493

* cited by examiner

*Primary Examiner*—Michael A. Lyons

(57) ABSTRACT

At least two discrete quarter wave plates are provided for use as plane mirrors or reflectors in a displacement measuring interferometer, where the plates share common or substantially common reflecting surface geometries. A plurality of geometrically matched discrete matched quarter wave plates reduces the amount of tilt between an input beam provided to, and an output measurement beam provided by, an interferometer, resulting in increased interferometer dynamic range.

34 Claims, 6 Drawing Sheets

DISCRETE QUARTER WAVE PLATES FOR DISPLACEMENT MEASURING INTERFEROMETERS

BACKGROUND

Displacement measuring interferometers ("DMIs") are well known in the art, and have been used to measure small displacements and lengths to high levels of accuracy and resolution for several decades. Among such devices, helium-neon displacement measuring laser interferometers have enjoyed relatively widespread application owing to their high degree of stability and monochromaticity. Interferometers require careful alignment of mirrors that must be sustained over extended periods of time, however, which can present considerable practical difficulties.

A double-pass DMI may be rendered partially insensitive to mirror misalignments and thermal effects by double-passing each arm of the interferometer and incorporating a means for inverting the wavefronts between passes. See, for example, "A Double-Passed Michelson Interferometer" by S. J. Bennett in Optics Communications, Volume 4, number 6, February/March, 1972, where double-passing is achieved using a polarized beam-splitter, two quarter-wave plates and a cube-corner reflector that serves as an inverting component, the entirety of the foregoing paper by Bennett hereby being incorporated by reference herein. In consequence of their commercial viability, robustness, stability and accuracy, double-pass displacement measuring interferometers find relatively common use in high accuracy displacement measurements.

Despite the many advances that have been made in the field of double-pass interferometers and DMIs generally, however, measurement errors and inaccuracies persist. Among the factors contributing to such errors and inaccuracies is relative beam displacement ("RBD"). See, for example, "Wavefront Metrology Errors" by Eric Johnstone et al. in 4th International Conference of the European Society for Precision Engineering and Nanotechnology (uespen) May-June 2004 Glasgow UK page 348-349 and "Recent Advances in Displacement Measuring Interferometry" by Norman Brobroff in Meas. Sci. Technol. 4(1993) 907-926, where some of these factors are discussed in detail, the entirety of the foregoing paper by Broboff hereby being incorporated by reference herein.

In a conventional monolithic dual-pass DMI, a laser source directs a beam towards an interferometer. A beam splitter in the interferometer splits the incoming beam and directs one portion of the beam into a reference arm and another portion of the beam into a measurement arm. The reference portion of the beam ("reference beam) is directed to a stationary plane mirror or cube corner retro-reflector attached to the beam splitter. The measurement portion of the beam ("measurement beam") is directed to a movable plane mirror or cube corner retro-reflector. Typically, both retro-reflectors or plane mirrors are positioned and mounted to redirect the reference and measurement beams so that they recombine at the splitting interface of the beam splitter and are next directed to a suitable detector for measurement of the phase angle between the reference and measurement beams (from which is determined the relative displacement between the beam splitter and the movable cube corner retro-reflector). Incorporated into the rear face of the beam splitter is a single quarter wave plate, which reflects and changes the polarization state of beams impinging upon it. Such beams are nominally reflected from the reference mirror quarter wave plate parallel to one another. The single quarter wave plate serving as a reference mirror for both beams typically exhibits some degree of concavity, convexity or other type of geometric imperfection along its reflective surface, however, which leads to output tilt error or RBD, where the center normal vectors of the two beams are quasi-convergent.

What is needed is a monolithic interferometer that minimizes RBD and tilt, and that does so in an economic and practical manner.

SUMMARY OF THE INVENTION

In accordance with one embodiment of the present invention, an interferometer assembly is provided comprising a polarizing beam splitter sub-assembly having at least one polarizing beam splitter interface located therewithin, wherein a plurality of discrete quarter wave plates are mounted to a surface of the beam splitter sub-assembly, each of the plurality of quarter wave plates having been selected by measuring the direction and magnitude of a pointing vector normal to the surface thereof, and then selecting only those quarter wave plates for incorporation into the interferometer assembly having angular differences between pointing vectors that are less than a predetermined amount, such as micro-radians. In a preferred embodiment of the present invention, the interferometer assembly is a dual-pass monolithic displacement measuring interferometer.

DETAILED DESCRIPTIONS OF THE PREFERRED EMBODIMENTS

Aspects of the DMIs discussed and illustrated herein are disclosed in the following U.S. patents and patent application, the respective entireties of which are hereby incorporated by reference herein: U.S. Pat. No. 5,064,280 to Bockman entitled "Linear-and-angular measuring plane mirror interferometer;" U.S. Pat. No. 6,542,247 to Bockman entitled "Multi-axis interferometer with integrated optical structure and method for manufacturing rhomboid assemblies;" U.S. Pat. No. 5,667,768 to Bockman entitled "Method and interferometric apparatus for measuring changes in displacement of an object in a rotating reference frame;" and pending U.S. Patent Application Publication No. US 2005/0008322 A1 to Sullivan et al. entitled "Direct combination of fiber optic light beams."

As employed in the specification, drawings and claims hereof, and in the context of discussing, describing and/or claiming a DMI, a portion of a DMI or a DMI system, the term "monolithic" means an interferometer having at least one polarizing or non-polarizing beam splitter sub-assembly comprising glass or an optically similar material and at least one cube corner, input, output, reflecting or retro-reflecting rhomb sub-assembly, also comprising glass or an optically similar material, where the beam splitter and the at least one cube corner, input, output, reflecting or retro-reflecting rhomb sub-assembly are physically located adjacent to one another, and are attached directly to one another by adhesive, mechanical, chemical, electromagnetic and/or magnetic means such that the optical portion of the interferometer (which does not include the source, the detectors or the measurement cube or plane mirror of a DMI or DMI system), forms a single assembly.

Figure 1:
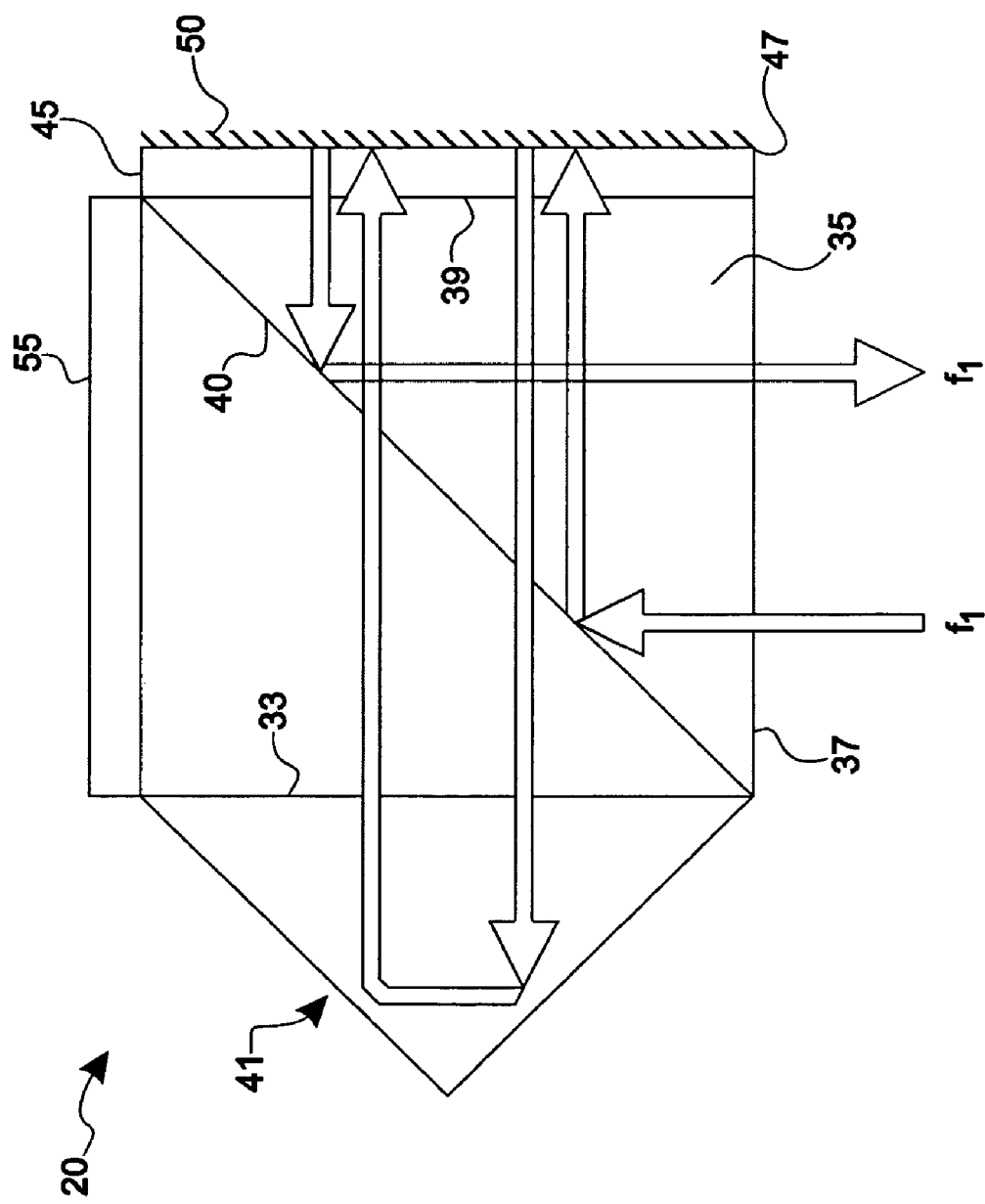
FIG. 1 shows idealized ray paths of a reference beam inside a conventional dual-pass plane mirror interferometer of the prior art.

FIG. 1 shows idealized ray paths of beam $f_1$ inside a conventional dual-pass plane mirror monolithic interferometer of the prior art. For the sake of clarity, only beam $f_1$ is shown in FIG. 1. A conventional dual-pass plane mirror interferometer employs two beams, however: the first beam being a reference beam, the second beam being a measurement beam.

Typically a dual-frequency Zeeeman split helium-neon laser source generates and emits the first and second beams having frequencies $f_1$ and $f_2$, where the first beam has a first circular polarization state and the second beam has a second polarization state different from the first polarization state (hereafter "beams $f_1$ and $f_2$").

Beams $f_1$ and $f_2$ emitted from the source are typically right- and left-rotationally polarized, respectively. Two laser modes are amplified in a cavity of the source, the two modes corresponding to the two polarization states. In a Zeeman split laser, the two polarizations are circular and of opposite-handedness. A telescope may be provided for expanding and collimating beams $f_1$ and $f_2$ emitted by the source for delivery to the remainder of the interferometry system.

Beams $f_1$ and $f_2$ are next typically directed through a quarter wave plate (also not shown in the drawings), where they are transformed from circularly-polarized states to linearly-polarized states before being presented to interferometer 20. Means are also provided for appropriately aligning linearly polarized beams $f_1$ and $f_2$ with the plane of incidence of polarized beam splitter interface 40 of interferometer 20, such means not being shown in the drawings.

Once linearly polarized beams $f_1$ and $f_2$ have been appropriately aligned with the plane of incidence of polarizing beam splitter interface 40, beams $f_1$ and $f_2$ are presented to polarizing beam splitter interface 40. Depending on their respective polarization states, beam $f_1$ or $f_2$ will be reflected from interface 40, while the other beam will be transmitted through interface 40.

FIG. 1 shows beam $f_1$ entering face 37 of polarizing beam splitter sub-assembly 35 ("PBS 35") and being reflected from interface 40 towards face 39 of polarizing beam splitter sub-assembly 35 and plane mirror 45. Highly reflective coating 50 disposed on the backside of mirror 45 changes the polarization state of beam $f_1$, and causes beam $f_1$ to be reflected back towards interface 40 from mirror reflecting interface 47. Interface 40, owing to the changed polarization state of beam $f_1$, now transmits beam $f_1$ therethrough towards face 33 of polarizing beam splitter sub-assembly 35 and corner cube 41. Next, beam $f_1$ is transmitted back through face 33 and interface 40 to be reflected from interface 47 of plane mirror 45 (where another change in polarization state is induced) and then interface 40 on its way out of interferometer 20 through face 37.

Figure 2:
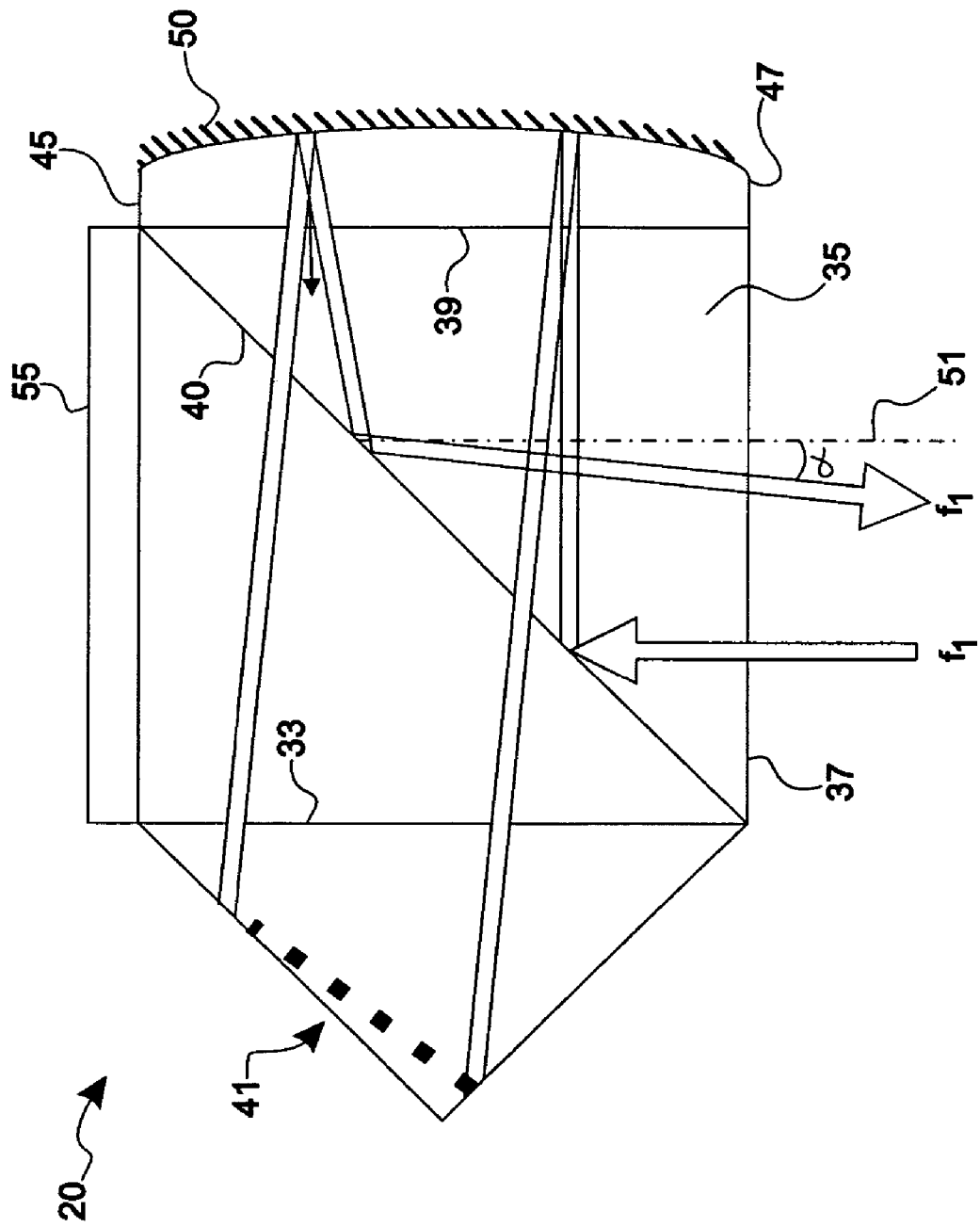
FIG. 2 shows how ray paths of a beam inside a conventional dual-pass plane mirror interferometer of the prior art deviate from idealized ray paths owing to beam tilt or displacement errors.

FIG. 2 shows how the ray paths of beam $f_1$ inside a conventional dual-pass plane mirror interferometer of the prior art deviate from idealized ray paths owing to beam displacement errors. In FIG. 2, tilt is induced in beam $f_1$ that results from single reference mirror quarter wave plate 45 having some degree of concavity along reflecting surface 47 thereof. Beams $f_1$ now emerges from interferometer 20 following a skewed non-normal ray path that does not conform to ideal output ray path or vector 51 (shown in FIG. 2 with a dashed and dotted line), such ideal ray path or vector 51 being normal to face 37. The skewed ray path of beam $f_1$ (which is at an angle $\alpha$ respecting ideal ray path 51) results from one or more geometric irregularities or imperfections occurring along Interface 47. In other words, interface 47 deviates from a perfectly flat or monotonic interface or surface.

Such irregularities and imperfections typically appear during the process of manufacturing mirror plate 45, coating 50 and PBS 35, and result in interface 47 assuming a concave shape, a convex shape, a shape that is both convex and concave, or a shape that otherwise deviates from a perfectly flat or monotonic interface or surface 47. In terms of spatial polynomials, undesired curvatures, imperfections or irregularities in interface 47 may be of the first, second, third or higher orders, and as mentioned above are commonly introduced during the process of manufacturing mirror plate 45, PBS 35 and coating 50. Provided they are of sufficient magnitude, any of such curvatures, imperfections or irregularities can lead to undesired skewing of the ray paths of beams $f_1$ and/or $f_2$.

Figure 3:
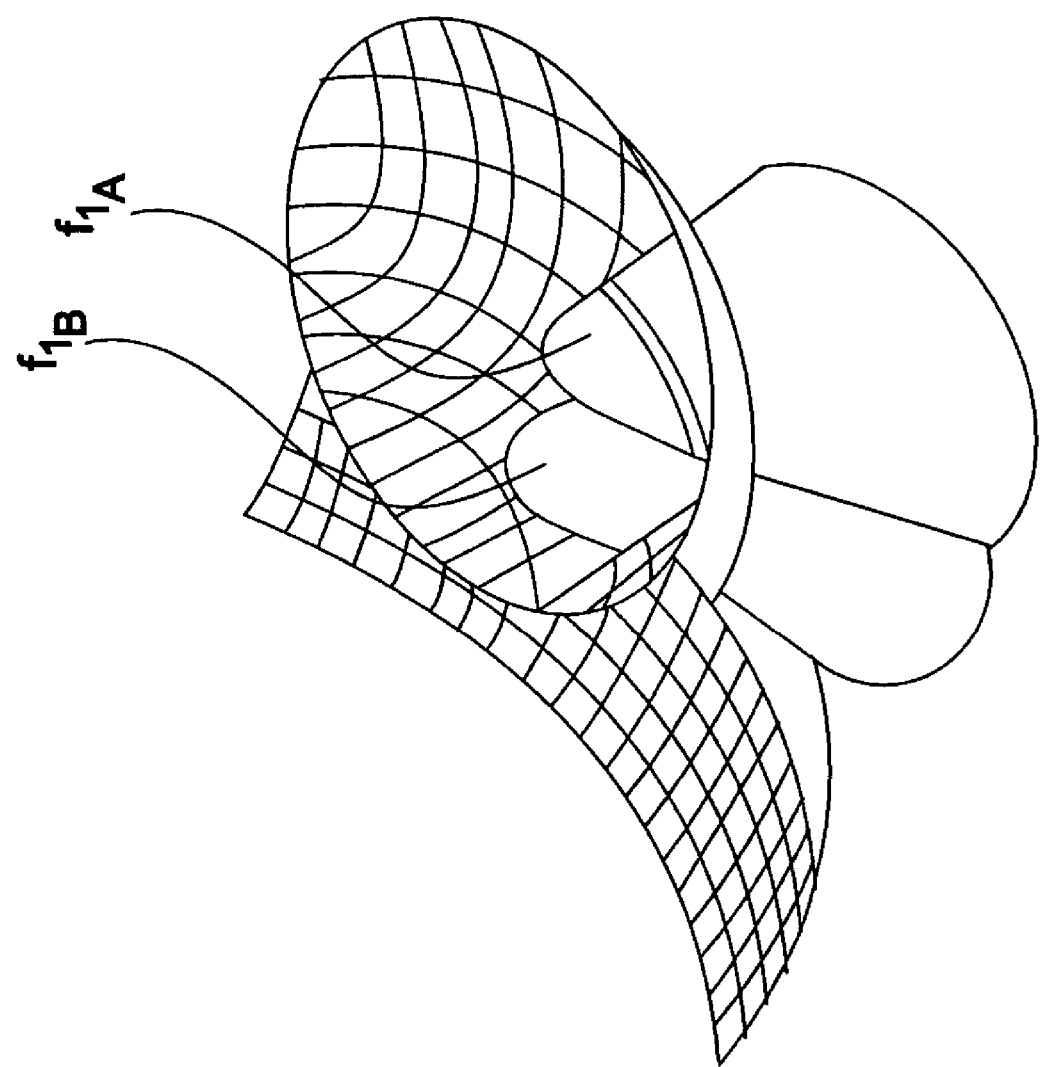
FIG. 3 shows representative relative beam displacement between input and output beams in a conventional dual-pass interferometer.

FIG. 3 shows representative relative beam displacement between input and output beams in a conventional dual-pass interferometer. In FIG. 3, a simple model for visualizing RBD in a monolithic dual-pass interferometer is presented, which results from the aforementioned tilt or skew. A dual-pass interferometer having a perfectly flat or monotonic interface 47 would result in the pointing vectors of beams $f_{1A}$ and $f_{1B}$ of FIG. 3 being coincident or matched, with no relative beam displacement occurring therebetweeen. But as shown in FIG. 3, the pointing vectors of beams $f_{1A}$ and $f_{1B}$ are not matched, their respective wavefronts being non-coincident and having differing intensity distributions, as a result of RBD. RBD may occur in a dual-pass interferometer system where the measure arm retro-reflector or plane mirror is displaced in a direction orthogonal to the incoming beam incident thereon, which leads to RBD and attendant measurement errors respecting the predicted or calculated translation of a movable retro-reflector or plane mirror along an axis parallel to the incoming measurement beam. See the foregoing paper by Johnstone et al. for further details concerning RBD in such interferometers.

Figure 4:
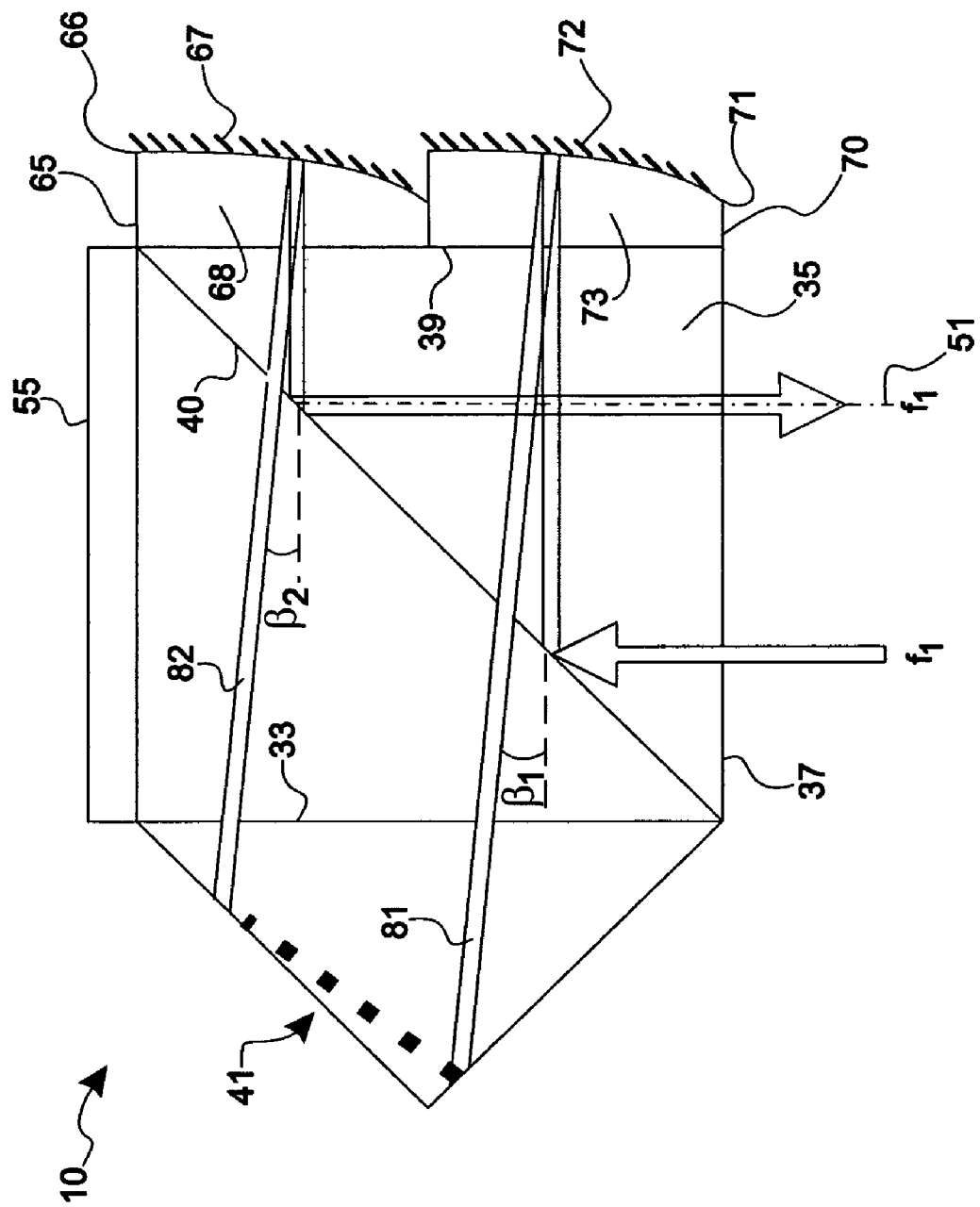
FIG. 4 shows one embodiment of a dual-pass interferometer of the present invention comprising a plurality of quarter wave plates attached to a face of a polarizing beam splitter sub-assembly.

FIG. 4 shows one embodiment of a dual-pass interferometer of the present invention comprising a plurality of quarter wave plates 65 and 70 attached to face 37 of polarizing beam splitter sub-assembly 35. Note that in FIG. 4 a plurality of mirror planes or quarter wave plates 65 and 70 are provided instead of single mirror plane or quarter wave plate 45 of FIGS. 1 and 2.

Quarter wave plates 65 and 70 comprise optical-grade glass layers or other birefringent material having highly reflective coatings 67 and 72 disposed on the rear surfaces thereof. As shown in FIG. 4, reflective interfaces 66 and 71 are both concave. As beam $f_1$ propagates through interferometer 10 and reflects from interfaces 66 and 71, rays reflected from such interfaces are tilted by angle beta from the desired ray paths orthogonal to planar front surfaces 68 and 73 of quarter wave plates 65 and 70. Such ray path geometries, where the rays paths corresponding to the reflected beams emerging from quarter wave plates 65 and 70 deviate from vectors normal to planar faces 68 and 73 by the same angle beta, result in output beam f1 being parallel to input beam $f_1$, as well as output beam $f_1$ being normal to face 37.

As will now be seen, matching or substantially matching deviations in geometry characterize interfaces 66 and 71 of quarter wave plates 65 and 70. In the case of FIG. 4, interfaces 66 and 71 are both concave and cause beams incident thereon to be reflected at an angle beta from the desired vectors positioned normal to interfaces 68 and 73. Such matching deviations lead to the results produced by the various embodiments of present invention: angles $\beta_1$ and $\beta_2$ are substantially similar in magnitude and cause rays 81 and 82 to be substantially parallel to one another, with the result that input beam f1 is substantially parallel to output beam f1. That is, the potentially ill effects of angle $\beta_1$ are cancelled out by the ensuing positive effects of angle $\beta_2$ owing to the overall geometry of interferometer 10 and geometrically-matched quarter wave plates 65 and 70.

In the present invention, it is preferred to measure the tilt corresponding to each of the various discrete quarter wave plates that may potentially be employed in constructing interferometer 10. Tilt angles may be measured using a Hartmann-Shack sensor, a modified phase shifting interferometer, or any other suitable system or machine for accurately measuring small angles. For a given pair or set of quarter wave plates, and in the light of limitations in the accuracy of state-of-the-art precision machine tooling, it has been discovered that tilts corresponding to each of the plates should be matched within about 5 micro-radians or less, or slightly less than one arc-second, of one another. Sets of discrete quarter wave plates selected on the basis of such matching tilts and incorporated into dual-pass interferometers produce the advantageous results of the present invention. Matching tilt tolerances between selected quarter wave plates such as less than about 7 micro-radians, less than about 6 micro-radians, less than about 4 micro-radians, less than about 3 micro-radians, less than about 2 micro-radians and less than about 1 micro-radian produce acceptable results. Progressively better results are obtained as the magnitude of the tilt tolerance difference between selected quarter wave plates diminishes. In such a manner the pointing vectors of selected pairs or sets of quarter wave plates are matched or substantially matched in magnitude and direction.

Quarter wave plates 65 and 70 of the present invention are preferably manufactured from optical-grade quartz, glass other suitable birefringent material, have a thickness of about 1 mm, a length of about 25 mm and a width of about 13 mm. Coating 67 or 72 preferably comprises a highly reflective dielectric coating comprising a plurality of suitable oxide strata, but may also be formed from a metal, metal alloy or other suitable highly reflective coating materials.

Figure 5:
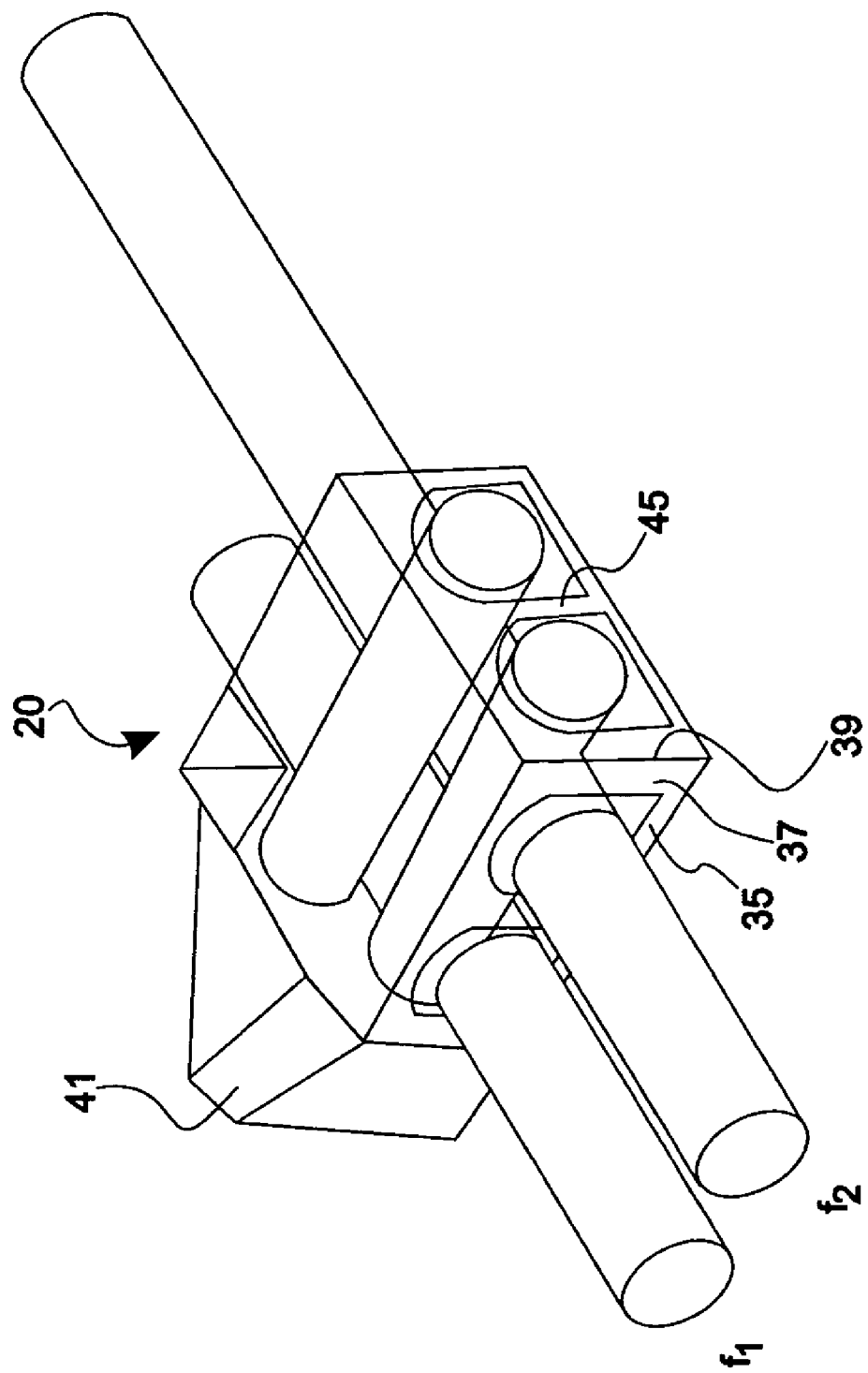
FIG. 5 shows a monolithic dual-pass interferometer of the prior art having a single quarter wave plate attached to a face of a polarizing beam splitter sub-assembly.
Figure 6:
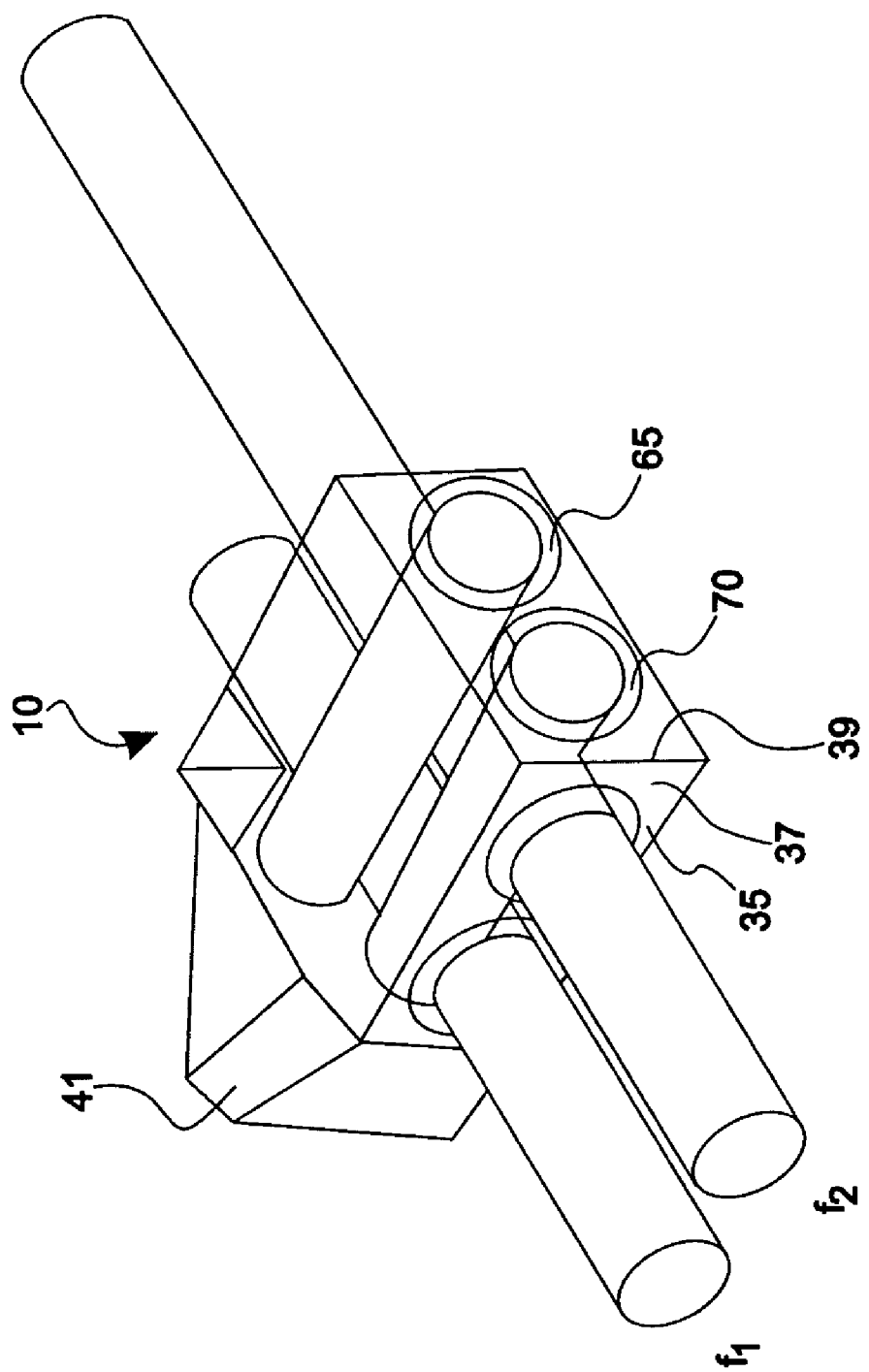
FIG. 6 shows a monolithic dual-pass interferometer of the present invention having a plurality of quarter wave plates attached to a face of polarizing beam splitter sub-assembly.

FIG. 5 shows a single-axis monolithic dual-pass interferometer 20 of the prior art having single quarter wave plate 45 attached to face 37 of polarizing beam splitter sub-assembly 35. FIG. 6 shows a single-axis monolithic dual-pass interferometer 10 of the present invention having a plurality of quarter wave plates 65 and 70 attached to face 37 of polarizing beam splitter sub-assembly 35.

Note that polarizing beam splitter interface 40 of the present invention preferably comprises an immersed polarizing beam splitting coating, or other suitable dielectric coating, sandwiched between two layers of optical glass, the coating being capable of selectively polarizing light beams incident thereupon. FIGS. 1, 2 and 3, and the accompanying descriptions set forth herein, describe aspects of Agilent's Model Number E1826 B/C/D Dual-Pass Interferometer. This interferometer is characterized by a monolithic design and structure.

Polarizing beam splitter sub-assembly 35, cube corner 41 and quarter wave plates 65 and 70 each preferably comprise a stack of appropriately machined (or otherwise formed) and coated quartz or glass plates or components as described in U.S. Pat. No. 6,542,247 to Bockman. In preferred embodiments of the present invention, the various sub-assemblies, corners and plates are glued together as described in U.S. Pat. No. 6,542,247 to Bockman. Accordingly, and consistent with the definition of the term "monolithic" set forth hereinabove, interferometer 10 shown in FIG. 4 is monolithic.

Note that the present invention includes within its scope interferometers having more than two matched discrete quarter wave plates. Accordingly, sets of three or more matched discrete quarter wave plates may be employed in the present invention. The present invention is also not limited in scope to monolithic interferometers, and may be successfully employed in various embodiments of non-monolithic interferometers.

We claim:

1. An interferometer assembly, comprising:
    a polarizing beam splitter sub-assembly comprising at least a first external face a having at least one polarizing beam splitter interface located therewithin;
    a first discrete quarter wave plate comprising a suitable birefringent material and having a first front surface and a first rear surface, the first front surface and first rear surface being substantially parallel to one another, a highly reflective first coating being disposed on the first rear surface, and first interface surface being defined by the intersection of the first rear surface with the first coating, and
    a second discrete quarter wave plate comprising suitable birefringent material and having a second front surface and a second rear surface, the second front surface and the second rear surface being substantially parallel to one another, a highly reflective second coating being disposed on the second rear surface, a second interface surface being defined by the intersection of the second rear surface with the second coating;
    wherein an angular difference between a first imaginary pointing vector positioned normal to the first interface surface and a second imaginary pointing vector positioned normal to the second interface surface is less than or equal to about seven micro-radians, and wherein a light beam reflected from said polarizing beam splitter sub-assembly is reflected by both said first and second interface surfaces prior to exiting said polarizing beam splitter sub-assembly.

2. The interferometer assembly of claim 1, wherein the angular difference between the first and second pointing vectors is less than or equal to about six micro-radians.

3. The interferometer assembly of claim 1, wherein the angular difference between the first and second pointing vectors is less than or equal to about five micro-radians.

4. The interferometer assembly of claim 1, wherein the angular difference between the first and second pointing vectors is less than or equal to about four micro-radians.

5. The interferometer assembly of claim 1, wherein the angular difference between the first and second pointing vectors is less than or equal to about three micro-radians.

6. The interferometer assembly of claim 1, wherein the angular difference between the first and second pointing vectors is less than or equal to about two micro-radians.

7. The interferometer assembly of claim 1, wherein the angular difference between the first and second pointing vectors is less than or equal to about one micro-radian.

8. The interferometer assembly of claim 1, wherein the interferometer assembly is a monolithic interferometer assembly.

9. The interferometer assembly of claim 1, wherein the interferometer assembly is a dual-pass interferometer assembly.

10. The interferometer assembly of claim 1, wherein at least one of the first coating and the second coating comprises at least one of a dielectric material, a metal and a metal alloy.

11. The interferometer assembly of claim 1, wherein at least one of the first front surface and the second front surface is glued to the first external face.

12. The interferometer assembly of claim 1, wherein the interferometer assembly is configured to operate as an interferometer having three or more optical axes.

13. The interferometer assembly of claim 1, wherein the interferometer assembly further comprises a corner cube for reflecting at least one of a measurement beam and a reference beam, wherein said light beam is reflected from said corner cube between being reflected from said first and second interface surfaces.

14. A displacement measuring interferometer assembly system, comprising:
  an interferometer assembly comprising a polarizing beam splitter sub-assembly having at least a first external face and at least one polarizing beam splitter interface located therewithin, said interferometer assembly comprising first and second ports for receiving a first reference laser beam and a measurement laser beam;
  a first discrete quarter wave plate comprising suitable birefringent material and having a first front surface and a first rear surface, the first front surface and first rear surface being substantially parallel to one another, a highly reflective first coating being disposed on the first rear surface, a first interface surface being defined by the intersection of the first rear surface with the first coating, and
  a second discrete quarter wave plate comprising suitable birefringent material and having a second front surface and a second rear surface, the second front surface and the second rear surface being substantially parallel to one another, a highly reflective second coating being disposed on the second rear surface, a second interface surface being defined by the intersection of the second rear surface with the second coating;
  wherein an angular difference between a first imaginary pointing vector positioned normal to the first interface surface and a second imaginary pointing vector positioned normal to the second interface surface is less than or equal to about seven micro-radians, and wherein a light beam reflected from said polarizing beam splitter sub-assembly is reflected by both said first and second interface surfaces prior to exiting said polarizing beam splitter sub-assembly.

15. The displacement measuring interferometer system of claim 14, wherein the angular difference between the first and second pointing vectors is less than or equal to about six micro-radians.

16. The displacement measuring interferometer system of claim 14, wherein the angular difference between the first and second pointing vectors is less than or equal to about five micro-radians.

17. The displacement measuring interferometer system of claim 14, wherein the angular difference between the first and second pointing vectors is less than or equal to about four micro-radians.

18. The displacement measuring interferometer system of claim 14, wherein the angular difference between the first and second pointing vectors is less than or equal to about three micro-radians.

19. The displacement measuring interferometer system of claim 14, wherein the angular difference between the first and second pointing vectors is less than or equal to about two micro-radians.

20. The displacement measuring interferometer system of claim 14, wherein the angular difference between the first and second pointing vectors is less than or equal to about one micro-radian.

21. The displacement measuring interferometer system of claim 14, wherein the interferometer assembly is a monolithic interferometer assembly.

22. The displacement measuring interferometer system of claim 14, wherein the interferometer assembly is a dual-pass interferometer assembly.

23. The displacement measuring interferometer system of claim 14, wherein at least one of the first coating and the second coating comprises at least one of a dielectric material, a metal and a metal alloy.

24. The displacement measuring interferometer system of claim 14, wherein at least one of the first front surface and the second front surface is glued to the first external face.

25. The displacement measuring interferometer system of claim 14, wherein the interferometer assembly is configured to operate as an interferometer having three or more optical axes.

26. The displacement measuring interferometer system of claim 14, wherein the interferometer assembly further comprises a corner cube for reflecting at least one of a measurement beam and a reference beam, wherein said light beam is reflected from said corner cube between being reflected from said first and second interface surfaces.

27. A method of making an interferometer assembly, the method comprising:
  providing a polarizing beam splitter sub-assembly comprising at least a first external face and having at least one polarizing beam splitter interface located therewithin;
  providing a first discrete quarter wave plate comprising suitable birefringent material and having a first front surface and a first rear surface, the first front surface and first rear surface being substantially parallel to one another, a highly reflective first coating being disposed on the first rear surface, a first interface surface being defined by the intersection of the first rear surface with the first coating;
  providing a second discrete quarter wave plate comprising suitable birefringent material and having a second front surface and second rear surface, the second front surface and the second rear surface being substantially parallel to one another, a highly reflective second coating being disposed on the second rear surface, a second interface surface being defined by the intersection of the second rear surface with the second coating;

measuring a first unit angular difference between a first imaginary pointing vector positioned normal to the first interface surface, and a normal to said first front surface and a second unit angular difference between a second imaginary pointing vector positioned normal to the second interface surface and a normal to said second front surface;

selecting the first and second quarter wave plates when the angular difference between said first and second unit angular differences is less than or equal to about seven micro-radians;

attaching the selected first and second quarter wave plates to the first external face of the polarizing beam splitter sub-assembly.

28. The method of making an interferometer assembly of claim 27, wherein the selecting step further comprises selecting the first and second quarter wave plates when the angular difference is less than or equal to about six micro-radians.

29. The method of making an interferometer assembly of claim 27, wherein the selecting step further comprises selecting the first and second quaffer wave plates when the angular difference is less than or equal to about five micro-radians.

30. The method of making an interferometer assembly of claim 27, wherein the selecting step further comprises selecting the first and second quarter wave plates when the angular difference is less than or equal to about four micro-radians.

31. The method of making an interferometer assembly of claim 27, wherein the selecting step further comprises selecting the first and second quarter wave plates when the angular difference is less than or equal to about three micro-radians.

32. The method of making an interferometer assembly of claim 27, wherein the selecting step further comprises selecting the first and second quarter wave plates when the angular difference is less than or equal to about two micro-radians.

33. The method of making an interferometer assembly of claim 27, wherein the selecting step further comprises selecting the first and second quarter wave plates when the angular difference is less than or equal to about one micro-radian.

34. The method of making an interferometer assembly of claim 27, wherein at least one of the first front face and the second front face is glued to the first external face.

* * * * *

UNITED STATES PATENT AND TRADEMARK OFFICE
CERTIFICATE OF CORRECTION

PATENT NO. : 7,330,272 B2
APPLICATION NO. : 11/119220
DATED : February 12, 2008
INVENTOR(S) : Belt et al.

It is certified that error appears in the above-identified patent and that said Letters Patent is hereby corrected as shown below:

In column 6, line 32, in Claim 1, after "face" delete "a" and insert -- and --, therefor.

In column 9, line 24, in Claim 29, delete "quaffer" and insert -- quarter --, therefor.

Signed and Sealed this

First Day of July, 2008

JON W. DUDAS
*Director of the United States Patent and Trademark Office*